(12) United States Patent
Longstaff (10) Patent No.: US 7,994,965 B2
(45) Date of Patent: Aug. 9, 2011

(54) SURVEILLANCE APPARATUS AND METHOD

(75) Inventor: Dennis Longstaff, Eight Mile Plains (AU)

(73) Assignee: Teledyne Australia Pty Ltd, Queensland (AU)

( * ) Notice: Subject to any disclaimer, the term of this patent is extended or adjusted under 35 U.S.C. 154(b) by 16 days.

(21) Appl. No.: 12/161,290

(22) PCT Filed: Jan. 16, 2007

(86) PCT No.: PCT/AU2007/000033
§ 371 (c)(1),
(2), (4) Date: Oct. 16, 2008

(87) PCT Pub. No.: WO2007/082335
PCT Pub. Date: Jul. 26, 2007

(65) Prior Publication Data
US 2010/0164784 A1    Jul. 1, 2010

(30) Foreign Application Priority Data
Jan. 17, 2006    (AU) ................................ 2006900219

(51) Int. Cl.
*G01S 13/42*    (2006.01)
(52) U.S. Cl. .......... 342/59; 342/180; 342/188; 342/153; 342/154; 342/157; 342/158
(58) Field of Classification Search ............. 342/27–28, 342/59, 90, 153–154, 157–158, 180, 188
See application file for complete search history.

(56) References Cited

U.S. PATENT DOCUMENTS

| | | | |
|---|---|---|---|
| 3,842,417 A | 10/1974 | Williams | |
| 3,924,236 A | 12/1975 | Earp et al. | |
| 4,571,591 A * | 2/1986 | Valentino et al. | ............. 343/754 |
| 4,612,547 A * | 9/1986 | Itoh | ............................... 342/372 |
| 5,038,150 A * | 8/1991 | Bains | ............................ 342/373 |

(Continued)

FOREIGN PATENT DOCUMENTS
WO    WO2007/045026    4/2007
(Continued)

OTHER PUBLICATIONS

Vaskelainen, L. J., "Virtual Array Synthesis Method for Planar Array Antennas," IEEE Transactions of Antennas and Propogation, vol. 46, No. 3, Mar. 1998, pp. 391-396.

(Continued)

*Primary Examiner* — John B Sotomayor
(74) *Attorney, Agent, or Firm* — McGuireWoods LLP; Safet Metjahic, Esq.

(57) ABSTRACT

A surveillance apparatus (100) is provided, said apparatus including a linear sub-array (101) of N omnidirectional transmitter elements (103) and a planar sub-array (102) of M receiver elements (104). A plurality of the transient elements (105) are generated by separating out at each of the receivers (104) the signals transmitted from the antenna elements (103) of the transmitter sub-array (101). This allows the geometry of each path (from each transmitter antenna element, to the point being imaged and back to the receiver antenna elements) to be converted to a delay or phase shift to focus on the particular point being imaged. The transient elements (105) form a cylindrical array (106) at the mid points between transmitter and receiver sub-arrays. Such a configuration enables a full 360 degrees of cover in azimuth and typically +/−60 degrees in elevation.

28 Claims, 6 Drawing Sheets

U.S. PATENT DOCUMENTS

| | | | |
|---|---|---|---|
| 5,657,024 | A | 8/1997 | Shingyoji et al. |
| 5,790,071 | A * | 8/1998 | Silverstein et al. ........... 342/354 |
| 6,104,346 | A * | 8/2000 | Rudish et al. ................. 342/424 |
| 6,215,443 | B1 | 4/2001 | Komatsu et al. |
| 6,246,365 | B1 * | 6/2001 | Tokoro .......................... 342/427 |
| 6,437,750 | B1 * | 8/2002 | Grimes et al. ................ 343/726 |
| 6,664,529 | B2 * | 12/2003 | Pack et al. ................. 250/208.1 |
| 7,391,362 | B2 * | 6/2008 | Beckner ........................ 342/179 |
| 2007/0139248 | A1 * | 6/2007 | Baharav et al. ................. 342/22 |
| 2007/0140174 | A1 | 6/2007 | Proctor, Jr. |
| 2008/0071169 | A1 | 3/2008 | Craddock et al. |
| 2008/0074307 | A1 | 3/2008 | Boric-Lubecke et al. |
| 2010/0164784 | A1 * | 7/2010 | Longstaff ...................... 342/202 |
| 2010/0204867 | A1 * | 8/2010 | Longstaff ........................ 701/26 |

FOREIGN PATENT DOCUMENTS

WO    WO2009/036507    3/2009

OTHER PUBLICATIONS

International Search Report and Written Opinion of the International Searching Authority from International Application No. PCT/AU2007/000033, mailed on Feb. 15, 2007, 10 pages.

International Search Report mailed Nov. 21, 2008 for PCT Application PCT/AU2008/001386.

Bliss, D.W. Forsyteh, K.W.: "MIMO Radar Medical Imaging: Self Interference Mitigation for Breast Tumor Detection", Signals, Systems and Computers 2006, ACSSC '06. Fortieth Asilomar Conference on Oct.-Nov. 2006, p. 1558-1562.

Liu, Bo Chan, Chunlin Liu, Benyoung: "Receiving Signal Processing of Wideband MIMO Radar Based on Transmitting Diversity", Rada 2006. CIE 06 International Conference on Oct. 2006 p. 1-4.

Bliss, D.W. Forsyteh, K.W.: Multiple-Input Multiple Output (MIMO) Radar and Imaging: Degrees of Freedom and Resolution:, Signals System and Computers 2003 Conference Record on Thirty Seventh Asilomar Conference on Nov. 9-12, 2003, p. 54-59 vol. 1.

Chu-Yang Chen Vaidyanathan, P.P.: "A Subspace Metho for MIMO Radar Space-Time Adaptive Processing" Acoustics, Speech and Signal Processing, 2007. ICASSP 2007. IEEE International Conference on Apr. 15-20, 2007, vol. 2, p. II-925-928.

IEEE XPlore Release 2.5; http://ieeexplore.ieee.org/xpls/absprintf.jsp?arnumber=1291865; Multiple-Input Multiple Output (MIMO) Radar and Imaging: Degrees of Freedom and Resolution; Bliss D.W. Forsythe K.W. Lincoln Lab., MIT, Lexington MA, USA.

IEEE Xplore Release 2.5; http://ieeexplore.ieee.org/xpls/absprintf.jsp?arnumber=4176830; MIMO Radar medical Imaging: Self Interference Mitigation for Breast Tumor Detection; Bliss, D.W. Forsythe, K.W. MIT Lincoln Laboratory, Lexington, MA.

IEEE Xplore Release 2.5; http://ieeexplore.ieee.org/xpls/absprintf.jsp?arnumber=4217561; A subspace Method for MIMO Radar Space-Time Adaptive Processing; Chun-Yang Chen Vaidyanathan, P.P. Dept of Electr. Eng., California Inst of Technol., Pasadena, CA.

IEEE Xplore Release 2.5; http://ieeexplore.ieee.org/xpls/absprintf.jsp?arnumber=4148263; Receiving Signal Processing of Wideband MIMO Radar Based on Transmitting Diversity; Liu, Bo Han, Chunlin Liu Bonyong Institute of Electronic Engineering, University of Electronic Science and Technology of China, Cheng du, China.

Donnet, B.J.; Longstaff, I.D., MIMO Radar, Techniques and Opportunities, Sep. 13-15, 2006, Radar Conference, 2006, EuRAD 2006, 3rd European, 112-115.

Bo Liu; Chunlin Han; Benyong Liu, Receiving Signal Processing of Wideband MIMO Radar Based on Transmitting Diversity, Oct. 16-19, 2006, Radar, 2006. CIE '06. International Conference, 1-4.

* cited by examiner

SURVEILLANCE APPARATUS AND METHOD

The present application claims priority under 35. U.S.C. §371 and is a national phase application of International Patent Application No. PCT/AU2007/000033, filed Jan. 16, 2007, which claims priority to Australian Patent Application No. 2006900219, filed Jan. 17, 2006, each of which is hereby incorporated by reference in its entirety.

BACKGROUND OF THE INVENTION

1. Field of the Invention

The present invention relates to a surveillance apparatus and method. In particular, although not exclusively, the present invention relates to radar systems including phased array radar systems.

2. Discussion of the Background Art

The principles of phased arrays have been utilized in a number of fields including telecommunications (e.g. AM broadcast stations), radio astronomy and radar systems since the Second World War. Typically such arrays include a number of active radiators coupled to a feed network. The phase of each feed signal supplied to each of the radiators is varied in such a way that the effective radiation pattern of the array is reinforced in a desired direction (i.e. directional beam), while being suppressed in undesired directions.

One type of phased array radar is a planar phased array which has good resolution and overcomes the limitations of mechanically scanned antennas. An example of a planar phased array radar presently in use is the "Aegis" combat system utilized by the United States Navy. At the heart of the Aegis system are several AN/SPY-1 radars each of which is a multi-function planar phased-array radar comprising an array of antenna elements including radiators and receivers, which define a radar aperture. The Aegis system is capable of search, automatic detection, transition to track, tracking of air and surface targets, and missile engagement support.

However a problem with such planar arrays is that they tend to be rather large and cumbersome and prone to wind loading effects, especially in mobile applications. The size and weight of planar arrays generally results from the number of elements populating the radar aperture. The number of elements populating the array is proportional to the area of the aperture needed for a given angular resolution. This makes them exceedingly difficult to mount on board ships and other moving vehicles. Furthermore the cost of producing such arrays is rather prohibitive and accordingly the use of such arrays has all but been limited, for example to a few military applications.

Another problem with the use of a planar phased array is that it typically only covers +/−45 degrees from the boresight. This characteristic requires the use of four arrays to provide full 360 degrees of azimuth coverage, such as in the Ageis system.

A number of techniques been utilized in order to overcome the problems associated with conventional phased array radar systems, such as synthetic aperture radar (SAR). In SAR applications a radar antenna is mounted on a fast moving platform whereby movement of the radar antenna enables synthesis of an aperture of a much bigger antenna in one dimension.

Clearly it would be advantageous if a surveillance apparatus and method could be provided that overcomes or at least ameliorates these and other problems of the prior art.

SUMMARY OF THE INVENTION

Disclosure of the Invention

Accordingly in one aspect of the present invention there is provided a surveillance apparatus said apparatus including:
   a first array of radar elements; and
   a second array of radar elements;
      wherein said first and second arrays are orthogonal to one another.

Preferably the radar elements of the first array are transmitter elements and the radar elements of the second array are receiver elements.

Suitably the transmitter elements periodically transmit a plurality of pulses, each pulse having a different signature code allowing the receiving elements to separate out return signals for each transmitting element reflected by one or more objects within range. Preferably each signature code is a carrier frequency selected from a set of predetermined frequencies.

In one form of the invention the transmitters may transmit a plurality of signal pulses utilizing time division multiplexing (TDM), wherein the time delay between successive transmitted pulses is of sufficient length to allow the separate reception of return signals reflected by one or more objects within range. Utilizing a TDM transmission scheme the design of the radar can be greatly simplified as it allows the signal from a single transmitter amplifier is switched sequentially to each transmitter element, the trade-off is that a long observation time is required to complete the transmission sequence.

Alternatively the transmitter elements may transmit a plurality of pulses utilizing code division multiplexing (CDM) scheme, whereby each transmitter simultaneously transmits at the same frequency a coded pulse wherein each pulse is coded with differing phase or amplitude modulations. Employing a CDM transmission scheme advantageously provides for a radar design which is capable of collecting a complete radar image from one transmission.

In yet another form of the invention the pulses may be transmitted in accordance with a frequency division multiplexing (FDM) scheme, wherein the carrier frequencies of the pulses are cycled incrementally after each transmission period, such that each transmitter element transmits a full set of pulses covering all the predetermined frequencies. Most preferably the pulses are transmitted in accordance with an orthogonal frequency division multiplexing (OFDM) scheme.

Preferably the number of frequency steps N is equal to or greater than number of transmitter elements L. Suitably the transmission of the pulses is staggered, i.e. during the transmission each pulse each transmitter element transmits a different carrier frequency within the sequence of pulses to that off the adjacent transmitter element(s).

Suitably, where a frequency division multiplexing scheme is utilized to transmit the pulses, a constant frequency separation is employed between the carrier frequencies of each pulse (i.e. the spacing between the carrier frequencies of each pulse in the frequency domain is identical). Preferably a variety of pulse compression techniques such as step-frequency range compression can be employed to further improve range resolution. Utilizing an FDM transmission scheme advantageously provides for a radar design with a very wide bandwidth for high range resolution.

In one arrangement the first array may be a linear array and the second array may be in the form of a planar array. In an alternate arrangement the first array may be in the form of a planar array and the second array may be a linear array.

Preferably, where an FDM transmission scheme the receiver elements are arranged such that each receiver element captures L×M×N time sequences, where L is the number of transmitter elements, M is the number of receiver elements and N is the number of frequency steps.

Suitably the radar elements associated with the planar array are positioned adjacent to the array perimeter. The planar array may define any suitable closed planar shape such as a circle, square, rectangle, octagon or the like. In another suitable form two planar arrays may be utilized, one above the other, the second mirroring the position of the first with spacing similar to the length of the linear array. In this case the number of receiver elements is doubled and the number of transmitters halved for a given antenna beam cover.

The linear array may be positioned within the perimeter of the planar array and most preferably positioned coincident with the centre of the planar array. Alternatively the linear array may be positioned external to the perimeter of the planar array.

In another aspect of the present invention there is provided a surveillance apparatus, said apparatus including:
 a first array of radar elements;
 a second array of radar elements, wherein said first and second arrays are orthogonal to one another;
 a feed network coupled to the radar elements of said first array;
 a processor coupled to the radar elements of the second array and said feed network, wherein said processor is adapted to synthesize a plurality of transient elements.

Preferably the radar elements of the first array are transmitter elements and the radar elements of the second array are radar receiver elements.

Preferably, for signals reflected from the far field, the plurality of transient elements act as transceiver elements positioned at the mid point between each transmitter element within the first array and each successive receiver element within the second array. For signals arriving from the near field the processing must account for elliptical rather than spherical contours of constant path delay.

In one arrangement the first array maybe a linear array and the second array maybe in the form of a planar array. In an alternate arrangement the first array maybe in the form of a planar array and the second array maybe a linear array.

Suitably the radar elements associated with the planar array(s) are positioned adjacent to the array perimeter. The planar array may define any suitable closed planar shape such as a circle, square, rectangle, octagon or the like. In another suitable form two planar arrays may be utilized, one above the other, the second mirroring the position of the first with spacing similar to the length of the linear array.

In this case the number of receiver elements is doubled and the number of transmitters halved for a given antenna beam cover.

The linear array maybe positioned within the perimeter of the planar array and most preferably positioned coincident with the centre of the planar array. Alternatively the linear array may be positioned external to the perimeter of the planar array.

Suitably the feed network is adapted to supply a plurality of pulses, each pulse having a different signature code allowing the receiving elements to separate out return signals for each transmitting element reflected by one or more objects within range.

Preferably, where an FDM transmission scheme is utilized each signature code is a carrier frequency selected from a set of predetermined frequencies. Preferably the transmitter elements periodically transmit the plurality of pulses.

Suitably the signal pulses are transmitted in accordance with a frequency division multiplexing (FDM) scheme, wherein the carrier frequencies of the pulses are cycled incrementally after each transmission period, such that each transmitter element transmits a full set of pulses covering the predetermined frequencies. Most preferably the pulses are transmitted in accordance with an orthogonal frequency division multiplexing (OFDM) scheme.

Preferably the number of frequency steps N is equal to or greater than number of transmitter elements L. Suitably the transmission of the pulses is staggered, i.e. during the transmission each pulse each transmitter element transmits a different carrier frequency within the sequence of pulses to that of the adjacent transmitter element/s.

Preferably, where an FDM transmission scheme is utilized the receiver elements are arranged such that each receiver element captures L×M×N time sequences where L number of transmitter elements, M is the number of receiver elements and N is the number of transmitter frequencies.

Suitably, where a frequency division multiplexing scheme is utilized to transmit the pulses, a constant frequency separation is employed between the carrier frequencies of each pulse (i.e. the spacing between the carrier frequencies of each pulse in the frequency domain is identical). Preferably a variety of pulse compression techniques such as step-frequency range compression can be employed to further improve range resolution. In this instance the step frequency technique facilitates the design of a radar with high range resolution, with low instantaneous bandwidth, the trade off being a long observation period to allow transmission of all the frequency steps.

Alternatively, where code division multiplexing is used to transmit the pulses, differing code sequences can be simultaneous transmitted, using codes which are separable at the receivers for beamforming. Such codes allow pulse compression as well as facilitating the beamforming process. Sets of code sequences which produce low or zero range sidelobes, may be utilized to reduce leakage into the other channels when separated for the beamforming process. Employing such a CDM scheme form allows the radar image to be synthesized from a single simultaneous burst of the differing codes.

Alternatively the transmitters may transmit a plurality of signal pulses utilizing time division multiplexing (TDM), wherein the time delay between successive transmitted pulses is of sufficient length to allow to reception of return signals reflected by one or more objects within range. Utilizing a TDM transmission scheme the design of the radar can be greatly simplified as it allows the signal from a single transmitter amplifier is switched sequentially to each transmitter element, the trade-off is that a long observation time is required to complete the transmission sequence.

Suitably the radar elements associated with the planar array are positioned adjacent to the array perimeter. The planar array may define any suitable closed planar shape such as a circle, square, rectangle, octagon or the like. In one form the planar array may include two planar arrays disposed parallel to each other i.e. the second array mirrors the position of the first with spacing similar to the length of the linear array.

The linear array may be positioned within the perimeter of the planar array and most preferably positioned coincident with the centre of the planar array. Alternatively the linear array may be positioned external to the perimeter of the planar array.

Preferably the generation of the transient elements is conducted in accordance with a coherent Multiple Input Multiple Output (MIMO) processing technique. Suitably the MIMO processing includes the steps of converting the distance between each transmitter element, and each receiver element to a delay time and then removing the delay time from the received signals, before summing the pulses and signals from all the transmitter and receiver element pairs.

In a further aspect of the present invention there is provided a surveillance apparatus, said apparatus including:
- a first array of radar transmitting elements for transmitting a plurality of pulses;
- a second array of radar receiving elements for receiving a plurality of signals reflected from one or more objects within the region of interest, wherein said first and second arrays are orthogonal to one another;
- a feed network coupled to the radar transmitting elements of said first array;
- a processor coupled to the radar receiving elements of the second array and said feed network, wherein said processor is adapted to generate from said received signals a three dimensional radar image comprising a plurality of transient elements.

In one arrangement the first array maybe a linear array and the second array maybe in the form of a planar array. In an alternate arrangement the first array maybe in the form of a planar array and the second array maybe a linear array Suitably each transient element acts as a transceiver element positioned at the mid point between each transmission element within the first array and each successive receiver element within the second array.

Preferably the generation of the transient elements is conducted in accordance with a coherent Multiple Input Multiple Output (MIMO) processing technique. Suitably the MIMO processing includes the steps of converting the distance between each transmitter element, and each receiver element to a delay time and then removing the delay time from the received signals, before summing the pulses and signals from all the transmitter and receiver element pairs.

Suitably the radar elements associated with the planar array are positioned adjacent to the array perimeter. The planar array may define any suitable closed planar shape such as a circle, square, rectangle, octagon or the like. The linear array maybe positioned within the perimeter of the planar array and most preferably positioned coincident with the centre of the planar array. Alternatively the linear array may be positioned external to the perimeter of the planar array.

In another suitable form two planar arrays may be utilized, one above the other, the second mirroring the position of the first with spacing similar to the length of the linear array. In this case the number of receiver elements is doubled and the number of transmitters halved for a given antenna beam cover. In this form the number of orthogonal codes required for a given number of elevation beams is halved, which reduces the potential for channel cross leakage. Additional parallel receiver arrays may be included in the structure giving design options between the number of transmitter and receiver elements to suit a particular application.

Suitably the feed network is adapted to supply a plurality of pulses, each pulse having a different signature code allowing the receiving elements to separate out return signals for each transmitting element reflected by one or more objects within range.

Preferably each signature code is a carrier frequency selected from a set of predetermined frequencies. Preferably the transmitter elements periodically transmit the plurality of pulses.

Suitably the signal pulses are transmitted in accordance with a frequency division multiplexing (FDM) scheme, wherein the carrier frequencies of the pulses are cycled incrementally after each transmission period, such that each transmitter element transmits a full set of pulses covering the predetermined frequencies. Most preferably the pulses are transmitted in accordance with an orthogonal frequency division multiplexing (OFDM) scheme.

Preferably the number of frequency steps N is equal to or greater than number of transmitter elements L. Suitably the transmission of the pulses is staggered, i.e. during the transmission each pulse each transmitter element transmits a different carrier frequency within the sequence of pulses to that of the adjacent transmitter element(s).

Suitably, where a frequency division multiplexing scheme is utilized to transmit the pulses, a constant frequency separation is employed between the carrier frequencies of each pulse (i.e. the spacing between the carrier frequencies of each pulse in the frequency domain is identical). Preferably a variety of pulse compression techniques such as step-frequency range compression can be employed to further improve range resolution.

Alternatively the transmitters may transmit a plurality of signal pulses utilizing time division multiplexing (TDM), wherein the time delay between successive transmitted pulses is of sufficient length to allow to reception of return signals reflected by one or more objects within range. Utilizing a TDM transmission scheme the design of the radar can be greatly simplified as it allows the signal from a single transmitter amplifier is switched sequentially to each transmitter element, the trade-off that a long observation time is required to complete the transmission sequence.

Suitably the transmitter elements may transmit a plurality of pulses utilizing code division multiplexing scheme, whereby each transmitter simultaneously transmits at the same frequency a coded pulse wherein each pulse is coded with differing phase or amplitude modulations.

In a further aspect of the present invention there is provided a surveillance method, said method including the steps of:
- transmitting a plurality of pulses from a first array of radar elements toward a region of interest;
- receiving by a second array of radar elements a plurality of signals reflected from one or more objects within the region of interest, wherein said second array is arranged orthogonally to said first array.

In one arrangement the first array may be provided in the form of a linear array and the second array may be provided in the form of a planar array. In an alternate arrangement the first array may be provided in the form of a planar array and the second array may be provided in the form of a linear array.

Suitably the arranging step further includes positioning radar elements associated with the planar array adjacent to the array perimeter. Furthermore the planar array may be arranged in any suitable closed planar shape such as a circle, square, rectangle, octagon or the like. In another suitable form two planar arrays may be utilized, one above the other, the second mirroring the position of the first with spacing similar to the length of the linear array. In this case the number of receiver elements is doubled and the number of transmitters halved for a given antenna beam cover.

Preferably the arranging step includes positioning the linear array within the perimeter of the planar array and most preferably positioned coincident with the centre of the planar array. Alternatively the linear array may be positioned external to the perimeter of the planar array.

Preferably the transmitting step involves transmitting said pluses in accordance with a frequency division multiplexing (FDM), wherein the carrier frequencies of the pulses are cycled incrementally after each transmission period, such that each transmitter element transmits a full set of pulses covering all the transmitted frequencies. Most preferably the transmitting step involves transmitting said pluses in accordance with an orthogonal frequency division multiplexing (OFDM) scheme.

Alternatively the transmitting step involves transmitting said pulses in accordance with a time division multiplexing (TDM) scheme, wherein the time delay between each successive transmitted pulse is of sufficient length to allow to reception return signals reflected by one or more objects within range. Utilizing a TDM transmission scheme the design of the radar can be greatly simplified as it allows the signal from a single transmitter amplifier is switched sequentially to each transmitter element, the trade-off is that a long observation time is required to complete the transmission sequence.

Suitably the transmitting step involves transmitting said pulses in accordance with a transmit a plurality of pulses utilizing code division multiplexing scheme, whereby each transmitter simultaneously transmits at the same frequency a coded pulse wherein each pulse is coded with differing phase or amplitude modulations.

Suitably the arranging step further includes arranging radar elements of the second array so as to capture L×M×N time sequences where M is the number of radar elements in the second array, L the number of radar elements in the first array and N the number of transmitted frequencies.

In yet another aspect of the present invention there is provided a surveillance method, said method including the steps of:
transmitting a plurality of pulses from a first array of radar elements toward a region of interest;
receiving by a second array of radar elements a plurality of signals reflected from one or more objects in the region of interest, wherein said second array is arranged orthogonal to said first array;
processing the transmitted pulses and the received signals to synthesize a plurality transient elements, wherein the transient elements act as transceivers positioned at the mid point between each transmitter element within the first array and each successive receiver element within the second array.

In one arrangement the first array may be provided in the form of a linear array and the second array may be provided in the form of a planar array. In an alternate arrangement the first array may be provided in the form of a planar array and the second array may be provided in the form of a linear array. In yet another arrangement the planar array may be composed of several planar arrays placed parallel to each other.

Preferably the transmitting step involves transmitting said pulses in accordance with a frequency division multiplexing (FDM), wherein the carrier frequencies of the pulses are cycled incrementally after each transmission period, such that each transmitter element transmits a full set of pulses covering all the transmitted frequencies. Most preferably the transmitting step involves transmitting said pluses in accordance with an orthogonal frequency division multiplexing (OFDM) scheme.

Alternatively the transmitting step involves transmitting said pulses in accordance with a time division multiplexing (TDM) scheme, wherein the time delay between each successive transmitted pulse is of sufficient length to allow to reception return signals reflected by one or more objects within range. Utilizing a TDM transmission scheme the design of the radar can be greatly simplified as it allows the signal from a single transmitter amplifier is switched sequentially to each transmitter element, the trade-off is that a long observation time is required to complete the transmission sequence.

Preferably the transmitting step involves transmitting said pulses in accordance with a transmit a plurality of pulses utilizing code division multiplexing scheme, whereby each transmitter simultaneously transmits at the same frequency a coded pulse wherein each pulse is coded with differing phase or amplitude modulations.

Suitably the arranging step further includes arranging the radar elements of the second array so as to capture L×M×N time sequences where M is the number of radar elements in the second array, L is the number of transmitter elements in the first array and N the number of transmitted frequencies.

The step of processing suitably involves the use of coherent MIMO processing. Suitably such processing includes the steps of converting the distance between each transmitter element, and each receiver element to a delay time and then removing the delay time from the received signals before summing the pulses and signals from all the transmitter and receiver element pairs.

Preferably the second array may be foldable with respect to the first array, wherein the second array is folded back onto the first array allowing the complete installation to be retracted. Preferably the second array includes a plurality of radial supports hinged at one end to the first array wherein each support includes a radar element pivotally mounted to the other end.

BRIEF DETAILS OF THE DRAWINGS

In order that this invention may be more readily understood and put into practical effect, reference will now be made to the accompanying drawings, which illustrate preferred embodiments of the invention, and wherein.

DESCRIPTION OF EMBODIMENTS OF THE INVENTION

Figure 1:
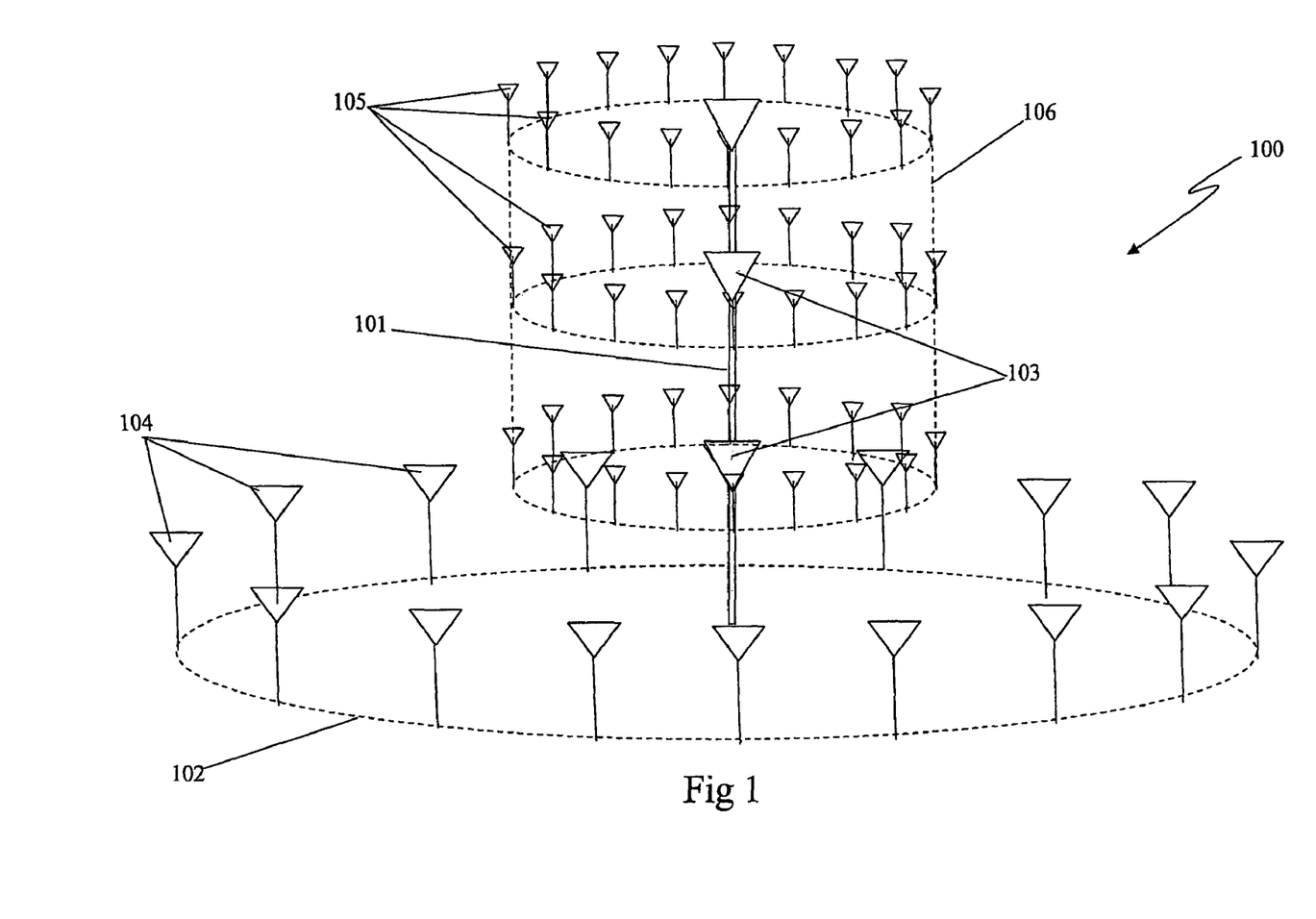
FIG. 1 is a schematic diagram of a surveillance array according to an embodiment of the invention.

With reference to FIG. 1 there is illustrated one possible configuration of a phased array 100 according to an embodiment of the present invention. The diagram shows the positions of the transient elements which together with the physical elements, notionally form a synthetic array for processing targets in the far field.

The array 100 in this instance comprises a linear sub-array 101 of N omnidirectional transmitter elements and a planar sub-array 102 of M receiver elements. In this particular instance the M receivers are arranged in a circular array about the linear sub-array. Such a configuration enables a full 360 degrees of cover in azimuth and typically +/−60 degrees in elevation. It will be appreciated by those of ordinary skill in the art that the planar sub-array need not be a circular array but may take the form of any other suitable planar shape such as a square, rectangle, triangle etc.

The process of generating transient elements makes use of the fact that the signal received from the far field with a bi-static transmitter receiver pair is identical to the signal which would be received by a single mono-static transmit/receive element placed at the mid point between the bi-static pair. For convenience, where the targets are in the far distance, the image computation can be based on the geometry arising from a notional plurality of transient elements. The technique can also be used for signals from the nearer field, but additional processing is required to account for an ellipsoidal co-phase surface with the bi-static elements at the foci. In the far field this ellipsoid tends to a spherical surface centred on a synthetic element at the mid-point.

In order to generate the transient elements 105 the signals transmitted from the antenna elements 103 of the transmitter sub-array 101 need to be readily separated out by each of the receivers 104 in the receiver sub-array 102. This allows the geometry of each path (from each transmitter antenna element, to the point being imaged and back to the receiver antenna elements) to be converted to a delay or phase shift to focus on the particular point being imaged. Thus in the case of the arrangement depicted in FIG. 1 the synthesized elements 105 form a cylindrical array 106 at the mid points between transmitter and receiver sub-arrays.

Generation of the transient elements is only possible where the reflected signals corresponding to each transmitted pulse is readily distinguishable at each of the receiver elements within the receiver array. That is each reflected signals is readily separable from the plurality of reflections received by each receiver element.

One approach to ensure ready separation of the received signals at each receiver element 104 is to simply switch a signal pulse between each transmitter element in turn, with sufficient time spacing between the pulses to allow reception of the radar echo (i.e. applying Time Division Multiplexing). Such an approach is an extremely viable for some applications where stationary or slow-moving scenes are to be monitored. However with this approach only one transmitter is operational at any one time so the total power available from a practical transmitter may be insufficient to form an image in the time required for some applications.

An alternative approach is to simultaneously transmit the plurality of pulses utilizing code division multiplexing scheme. The advantage with such a transmission technique is that it provides for greater transmitter powers. Another advantage of this technique is that a range compression operation can be applied during the de-multiplexing process, so as to improve the range resolution of the image. However, a potential drawback with the use of such a transmission scheme is that channel leakage can occur. Where a large number transmitter codes are used simultaneously there is the potential these codes to leak into one another during de-multiplexing thereby accumulate unwanted interference.

A more feasible approach to the generation of transient elements 105 for such high speed tracking applications is the use of so called coherent Multiple-Input Multiple-Output (MIMO) processing. As above the generation of transient elements under MIMO processing is only possible where each receiver element is able to separate the return signals in order to match them to the corresponding frequency transmitted from each transmitter element (i.e. a form of multi-static processing within the array itself). This can be facilitated by multiplexing the waveforms applied to each transmitter, in the present case frequency division multiplexing (FDM) is applied.

Under the coherent MIMO approach each of the transmitter elements simultaneously transmit a signal pulses in accordance with a frequency division multiplexing (FDM) scheme. After each transmission period, the carrier frequencies of the pulses are cycled incrementally such that each transmitter element transmits a full set of pulses covering all the transmitted frequencies. For example in the first transmission period a set of pulses having the carrier frequencies $[f_1, f_2, \ldots, f_n]$ are transmitted where $f_1$ is transmitted on the first transmitter element $T_1$ and is $f_n$ the nth frequency in the set transmitted on the nth transmitter element $T_n$. After the first increment $f_n$ is transmitted on $T_1$ and $f_1$ on $T_2$ and $f_{n-1}$ transmitted on $T_n$. This ensures that each of the receiver elements capture M×N time sequences where M is the number of receiver antenna elements and N is the number of transmitter frequency steps.

These time sequences must be captured by sampling at time increments equal to or shorter than the transmitter pulse length. Hence, for a sequence of N pulses cyclically transmitted from L transmitter elements at N different carrier frequencies, the set signals received by the M receiver elements, results in a set of L×M×N time sequences.

The advantage of utilizing frequency division multiplexing is that the leakage between de-multiplexed channels is substantially minimized. The potential for leakage such between channels under a frequency division multiplexing scheme may be further reduce by employing orthogonal frequency division multiplexing (OFDM) or by utilizing long pulses i.e. the bandwidths of the pulses are narrower than their frequency separation. Where long pulses are employed they can run together allowing continuous wave transmission which in turn makes the radar more difficult to detect Such an approach is in direct contrast to conventional phased array processing where the signals from the transmitter elements combine in the far field and become inseparable at the receiver elements. The advantage of coherent MIMO processing is that more information is captured at each receiver element which in effect allows for the syntheses of additional antenna transmit/receive elements.

Furthermore repeated viewing of the aperture with coherent waveforms as under the coherent MIMO technique allows the phase change in any one cell to be monitored enabling the movement and velocity of any part of the radar image to be measured. This coherent illumination of the aperture enables the array to be used in a number of applications such as interferometric radar or pulse Doppler radars.

In applications where the transmission and processing schemes utilize OFDM, a variety of orthogonal coding techniques can also be employed. This allows for the implementation of both range compression and beamforming. Processing for both range compression and beamforming utilize the amplitude and phase of or the equivalent in-phase and quadrature components of the received signals.

In range compression operation the data from each receiver antenna element is processed to separate out the orthogonal channels and combined to the L×M beams (processing for all elements may also be conducted in parallel). These have low range resolution. A Fourier transform is then applied the set of received signals for all the complete set of transmitted OFDM pulses. This is repeated for all the time samples and all beams. This delivers a fine-range profile for the range/time interval between the original set of transmitted OFDM pulses and the corresponding return set. The fine-range profile may then be sequenced to give a high range resolution profile. Each of the original range samples are converted to N fine range samples (i.e. a step-frequency range compression is applied).

Thus after the application of the range compression operation the set of L×M×N time sequences is reduce to L×M time sequences, resulting in increase of the range resolution of the image by a factor of N times where N is the number of frequency steps.

The Beam-forming operation combines the data from all the elements to deliver a three dimensional image defined in terms of range azimuth and elevation. Each voxel (3D pixel) in the image will be related to radar reflection coefficient of any reflectors in a given section of the volume of interest. To form the image the round distance between each transmitter element, the voxel being measured and each receiver element must be known. These distances are converted to delay time which must be removed from the received data set to cause alignment at the voxel point being imaged. This must be done for all voxel points. Simple delay and add processing can be replaced by applying equivalent phase shifts in narrow band radars.

The underlying process of forming an image is to sum signal data from all the transmitter/receiver pairs such that the data will be aligned in time (or phase) for each voxel in the image. The signals to be summed can be weighted to form beams and pulses with specified sidelobe characteristics. The round trip propagation path length from the transmitter to a particular point in the space to be imaged and back to the receiver can be computed for all antenna pairs and all points in the image. These path lengths can then be readily converted to the delays or phase shifts required for image formation. In the near field the notion of the transient element breaks down, here the imaging process can still be completed by time shifting the data to align returns from each pixel. In the near field the co-phase points form an ellipsoidal surface of revolution with foci at the elements. As range is increased the ellipsoidal co-phase surfaces become more spherical centred on the mid point which is the position of the transient element.

In addition to above a number of anti jamming techniques may also be employed, such as null steering. The basic principle of null steering is to shape the beam such that a source of noise/interference coincides with a direction of very low power/sensitivity within the beam. Varying the position of the nulls allows the array to minimize the effects of a noise/interference source with only minor impact on the position and shape of the main lobe. A further advantage to the use of null steering is that it provides for an improved signal-to-noise ratio.

Figure 2:
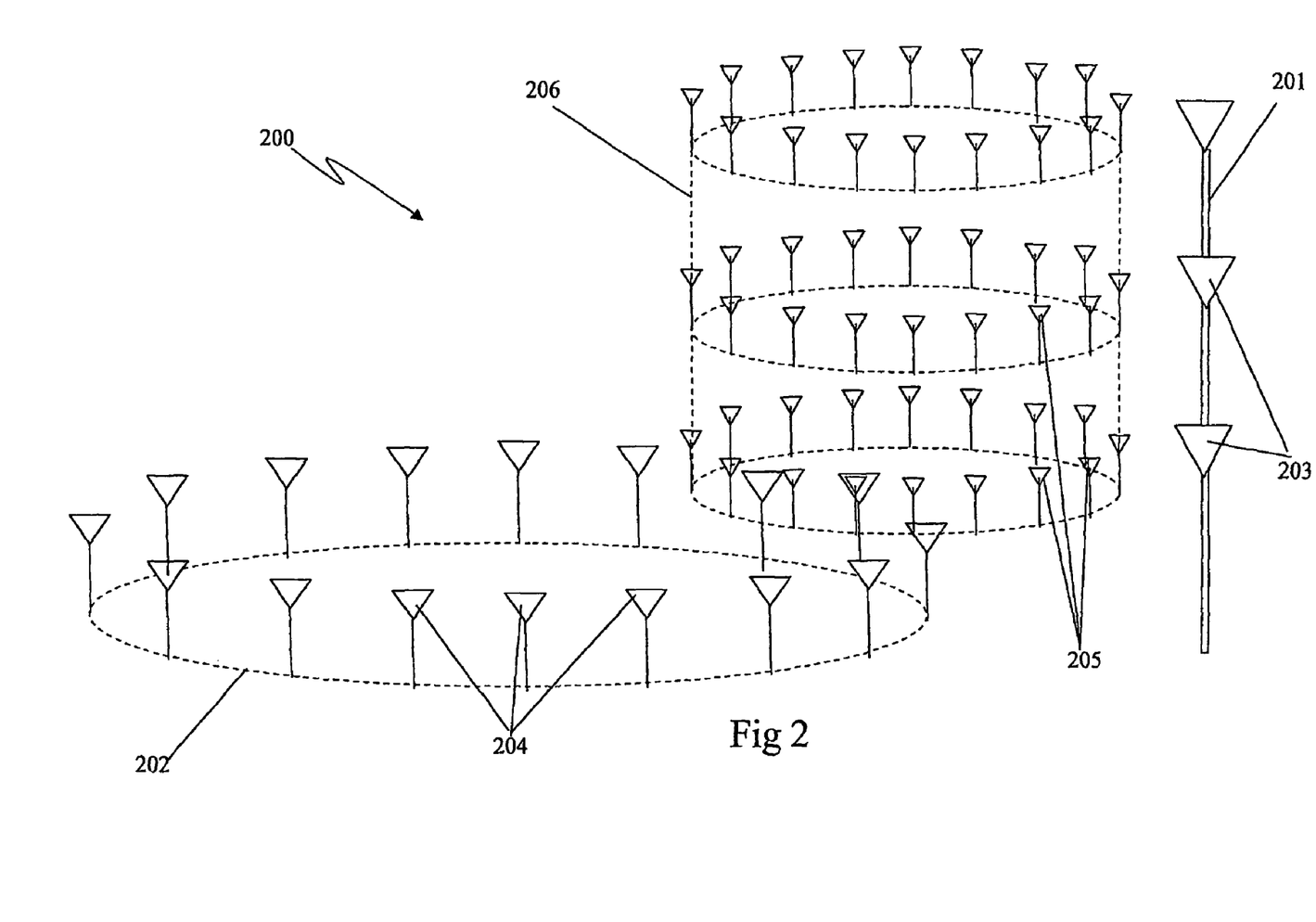
FIG. 2 is a schematic diagram of a surveillance array according to an embodiment of the invention.

FIG. 2 depicts a surveillance array configuration 200 according to an embodiment of the invention. The transmitter sub-array 201 in this case is located outside of the receiver sub-array 202. In this form the transient elements 205 still form a cylindrical array 206 at the mid points between transmitter 201 and receiver 202 sub-arrays, but the increased separation between transmitter and receiver pairs must be accounted for in the signal processing.

Figure 3:
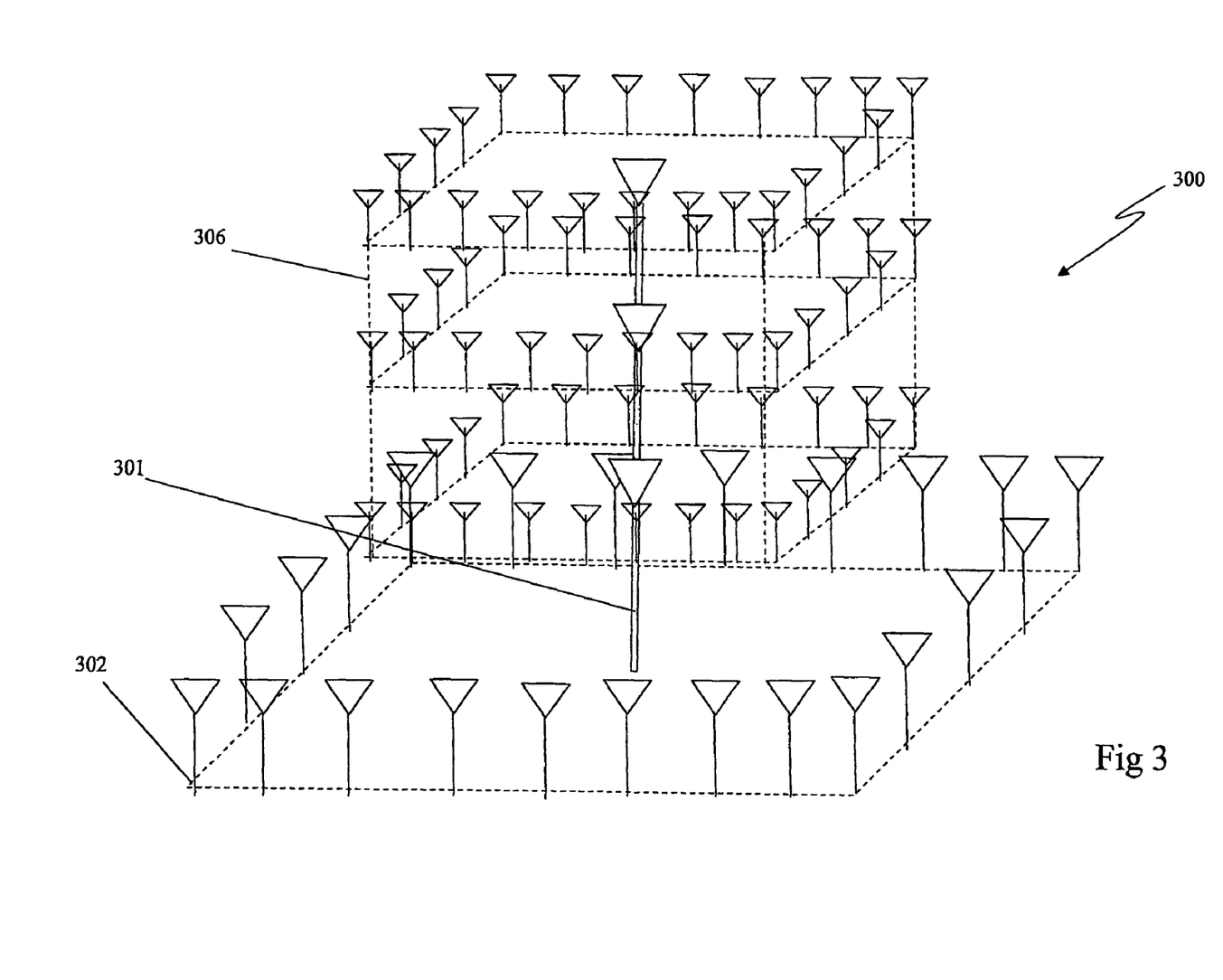
FIG. 3 is a schematic diagram of a surveillance array according to a further embodiment of the invention.

With reference to FIG. 3 there is illustrated one further possible configuration of a surveillance array 300 of the present invention. In this instance the receiver sub-array 302 is in the form of a square. Such a configuration forms a three-dimensional antenna with a box-like form 306 at the mid points between transmitter 301 and receiver 302 sub arrays. The advantage of such a configuration is that beam-forming can be sped up by using fast Fourier transforms.

Figure 4:
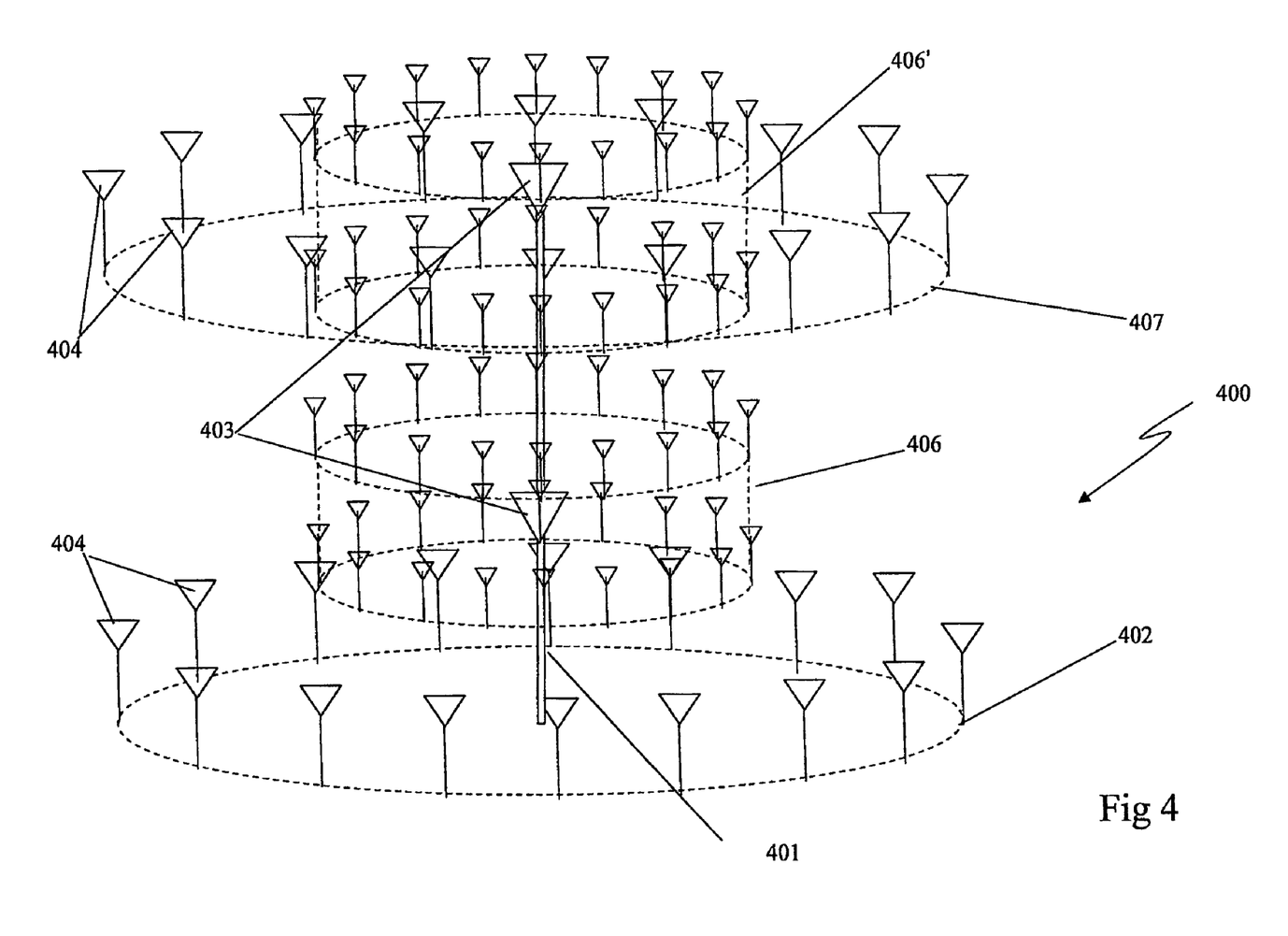
FIG. 4 is a schematic diagram of a surveillance array according to yet a further embodiment of the invention.

FIG. 4 illustrates possible configuration of a surveillance array 400 of the present invention. In this instance the receiver sub-array 402 includes two planar arrays 407, 408 disposed parallel to each other i.e. the second array 408 mirrors the position of the first with spacing similar to the length of the linear array. Such a configuration forms two three-dimensional antenna having cylindrical form 406 and 406' at the mid points between transmitter 401 and receiver 407, 408 sub arrays. In this case the number of receiver elements is effectively doubled and the number of transmitters halved for a given antenna beam cover. In addition the number of orthogonal codes required for a given number of elevation beams is halved, which reduces the potential for channel cross leakage.

The above configurations of the surveillance array may be deployed in a wide variety of applications. For example the surveillance array may used in such applications as air and ground defence, ballistic tracking, target acquisition, wind shear warning radar and spectrum sharing i.e. dual radar communications.

One example of the application of the surveillance array is a ship based radar system the advantage of such a system is that it has a low top weight/wind load. Furthermore, if the radar is given a dual communication spectrum sharing capability, then the MIMO process minimizes the adverse fading effects which commonly degrade ship to ship communications.

Yet another example of the type of application in which the surveillance array of the present application can be employed is a covert urban radar for curfew monitoring as the radar antenna is easily disguised. In such an application the radar wave form is a LPI waveform and offers a communication link.

Figure 5A:
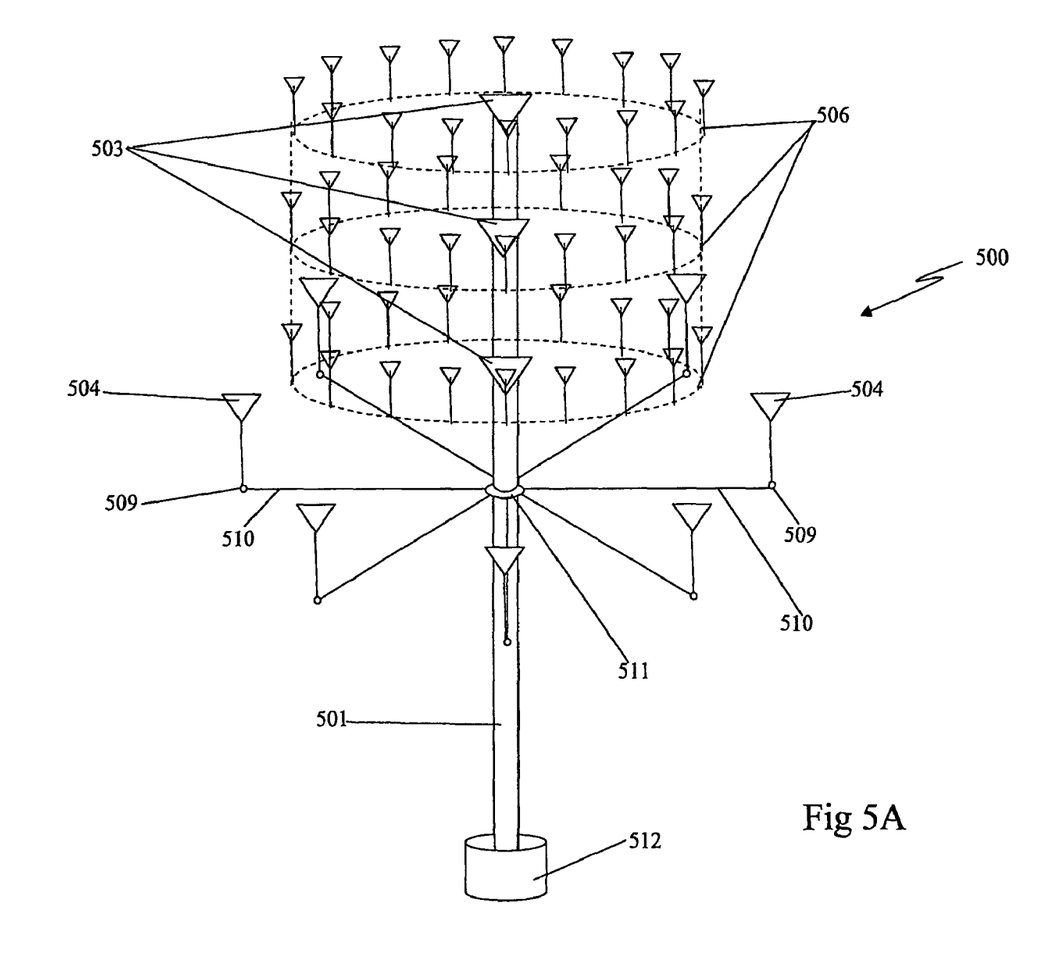
FIG. 5A is a schematic diagram of a foldable surveillance array in the unfolded state according to yet a further embodiment of the invention.
Figure 5B:
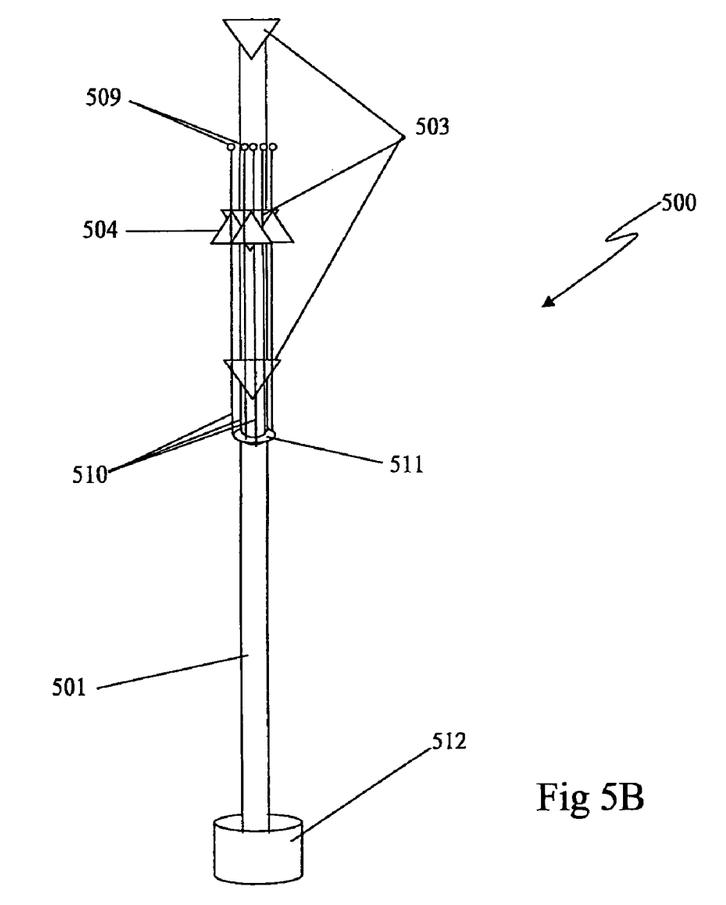
FIG. 5B is a schematic diagram of a foldable surveillance array in the folded state according to yet a further embodiment of the invention.

In another possible configuration of the present invention the sub-array of receiving elements 502 may be foldable with respect to the transmitter sub-array 501 as shown in FIGS. 5A and 5B. In FIG. 5A the surveillance array 500 is shown in the unfurled state. Here receiving 504 elements are pivotally mounted 509 the ends of radial supports 510, the radial supports are inturn hinged to a support flange 511 mounted on the transmission array 501. As shown both the receivers 504 are in the upright position with radial supports 510 extending substantially orthogonal to the support flange 511 and transmission array 501 so as to generate a three-dimensional antenna having cylindrical form 406.

5B shows the surveillance array 500 in the closed state, here the receiving elements have been pivoted about 509 so that they lie flat along their corresponding radial support 510. The radial supports are then swung on their hinged end toward the transmitter array 502 so as to enable the transmission array 502 to be telescopically withdrawn via tube 512.

On example of where such an arrangement has application is where a radar antenna is to be extended to collect a radar image and then retracted to minimize visibility or to allow mobility such as submarine. Utilizing this configuration the radar can be extended above the ocean surface through a tube, the array opened to obtain an image, then folded and withdrawn. Similarly, an unmanned air vehicle (UAV) could extend an array once airborne for a radar with better angular resolution than one mounted within the nose. The concept of a folding array may also be utilized in mobile ground force applications such as ground mobile warning and control systems G-MWACS or a single vehicle for radar and DF/ESM or the provision of dual radar and communications for a task-force via MIMO WiFi.

The basis of the element synthesis technique can be understood from the notion that a pair of array antenna elements used in a bi-static manner will collected exactly the same far-field data as from a single mono-static element placed midway between the bi-static elements. This in effect allows phantom, or transient elements to be synthesized between all pairs of elements in a phased array. The Inventor has realized that for an annular array of N elements, phantom elements can be synthesized between all pairs, allowing the annulus to be filled with approximately N-squared phantom or transient elements. This forms a planar array with the ability to view a sector of typically +/−60 degrees in azimuth and elevation from the normal to the array face.

However in the prior art concepts of aperture and element synthesize are only capable of producing 2 dimensional apertures, with the latter like its real aperture radar (RAR) phased array counterpart at least four phased arrays are required to provide full 360 degrees azimuth coverage. Now the surveillance method and apparatus of the invention provide for full 360 degree azimuth coverage from a static and compact array.

It will be appreciated by those of ordinary skill in the art, with reference to the teachings of the invention that the shape of the resulting 3 dimensional antenna depends upon the shape of the planar array. For example if the array were in the shape of a sector of the circle the resulting synthesized antenna would be a sector of a cylindrical surface. Such a configuration could allow radar imaging over that sector which could be wider than the sector seen by a conventional planar phased array.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A surveillance apparatus, said apparatus comprising:
   a first array of radar elements;
   a second array of radar elements, wherein the first array of radar elements and the second array of radar elements are orthogonal to one another;
   a feed network coupled to one or more radar elements of said first array of radar elements;
   a processor coupled to one or more radar elements of the second array of radar elements and said feed network, wherein said processor is adapted to synthesise a plurality of transient elements.

2. The apparatus of claim 1, wherein the first array of radar elements comprises transmitter elements and the second array of radar elements comprises receiver elements.

3. The apparatus of claim 2, wherein the transmitter elements periodically transmit a plurality of pulses, each pulse having a different signature code allowing the receiver elements to separate out a reflected signal from a plurality of reflected signals for each transmitting element, wherein the plurality of reflected signals are reflected by one or more objects within a region of interest.

4. The apparatus of claim 3, wherein each signature code comprises a carrier frequency selected from a set of predetermined frequencies.

5. The apparatus of claim 2, wherein the transmitter elements transmit a plurality of pulses utilizing time division multiplexing (TDM), wherein successive pulses of said plurality of pulses are transmitted at a time delay of sufficient length to allow the receiver elements to separate out a reflected signal from a plurality of reflected signals for each transmitter element, wherein the plurality of reflected signals are reflected by one or more objects within a region of interest.

6. The apparatus of claim 2, wherein the transmitter elements transmit a plurality of pulses utilizing code division multiplexing scheme, whereby each transmitter element simultaneously transmits a coded pulse of the same frequency allowing the receiver elements to separate out a reflected signal from a plurality of reflected signals for each transmitter element, wherein the plurality of reflected signals are reflected by one or more objects within a region of interest.

7. The apparatus of claim 6, wherein each pulse of said plurality of pulses is coded with a differing phase modulation or a differing amplitude modulation.

8. The apparatus of claim 2, wherein the transmitter elements transmit a plurality of pulses in accordance with a frequency division multiplexing (FDM) scheme, wherein each pulse comprises a carrier frequency selected from a set of predetermined frequencies allowing the receiver elements to separate out a reflected signal from a plurality of reflected signals for each transmitter element, wherein the plurality of reflected signals are reflected by one or more objects within a region of interest.

9. The apparatus of claim 8, wherein the carrier frequencies of the plurality of pulses are cycled incrementally after each transmission, such that each transmitter element transmits a sequence of pulses covering the set of predetermined frequencies.

10. The apparatus of claim 8, wherein the plurality of pulses are transmitted in accordance with an orthogonal frequency division multiplexing (OFDM) scheme.

11. The apparatus of claim 9, wherein the transmission of the plurality of pulses is staggered, whereby each transmitter element transmits a pulse having a different carrier frequency than an adjacent transmitter element.

12. The apparatus of claim 11, wherein the sequence of pulses comprises a number N of frequency steps that is equal to or greater than a number L of transmitter elements in the first array of radar elements, wherein the number L comprises substantially all of the transmitter elements in the first array of radar elements.

13. The apparatus of claim 12, wherein the receiver elements are arranged such that each receiver element of the second array of radar elements captures L×M×N sequences of pulses, where M is the number of receiver elements in the second array of radar elements.

14. The apparatus of claim 9, wherein a constant frequency separation is maintained between the carrier frequencies of each pulse.

15. The apparatus of claim 14, wherein each pulse comprises code compression.

16. The apparatus of claim 15, wherein the pulse code compression includes step-frequency range compression.

17. The apparatus of claim 1, wherein the first array of radar elements comprises a linear array of radar elements and the second array of radar elements comprises a planar array of radar elements.

18. The apparatus of claim 1, wherein the first array of radar elements comprises a planar array of radar elements and the second array of radar elements comprises a linear array of radar elements.

19. The apparatus of claim 17, wherein the planar array of radar elements defines a closed planar shape selected from at least one of the following: a circle, a square, a rectangle or an octagon.

20. The apparatus of claim 18, wherein the planar array of radar elements defines a closed planar shape selected from at least one of the following: a circle, a square, a rectangle, or an octagon.

21. The apparatus of claim 17, wherein the radar elements of the second array of radar elements are positioned adjacent to a perimeter of the planar array of radar elements.

22. The apparatus of claim 21, wherein the linear array of radar elements is positioned within the perimeter of the planar array of radar elements.

23. The apparatus of claim 22, wherein the linear array of radar elements is positioned coincident with the centre of the planar array of radar elements.

24. The apparatus of claim 21, wherein the linear array of radar elements is positioned external to the perimeter of the planar array of radar elements.

25. The apparatus of claim 21, wherein one or more of the radar elements of the planar array of radar elements are foldable with respect to the linear array of radar elements.

26. The apparatus of claim 24, wherein the planar array of radar elements comprises a plurality of radial supports hinged at one end to the linear array of radar elements, wherein each radial support comprises at least one receiver element pivotally attached thereto such that when the radial supports are swung upon the hinged end toward the linear array of radar elements, each receiver element pivots to lie substantially flat along a radial support.

27. A surveillance apparatus, said apparatus comprising:
an array of radar transmitting elements that transmit a plurality of pulses;
an array of radar receiving elements that receive a plurality of reflected signals, wherein the plurality of reflected signals are reflected from one or more objects within a region of interest, wherein said array of radar transmitting elements and said array of radar receiving elements are orthogonal to one another;
a feed network coupled to one or more radar transmitting elements of said array of radar transmitting elements; and
a processor coupled to one or more radar receiving elements of the array of radar receiving elements and said feed network, wherein said processor is adapted to generate from said plurality of reflected signals a three dimensional radar image, wherein the three dimensional radar image is based on a plurality of transient elements.

28. A method of conducting surveillance of a region of interest, said method comprising:
transmitting a plurality of pulses from a first array of radar elements toward the region of interest;
receiving by a second array of radar elements a plurality of reflected signals that are reflected form one or more objects in the region of interested, wherein said second array of radar elements is arranged orthogonal to said first array of radar elements; and
processing the transmitted plurality of pulses and the reflected signals to synthesise a plurality of transient elements, wherein each of the transient elements act as a transceiver that is positioned at a mid point between a transmitter element within the first array of radar elements and a receiver element within the second array of radar elements.

* * * * *